United States Patent [19]
Kadkade et al.

[11] Patent Number: 4,506,474
[45] Date of Patent: Mar. 26, 1985

[54] USE OF NIGHT-BREAK LIGHTING TO INCREASE FRUIT SET IN ECONOMICALLY IMPORTANT FRUIT CROPS

[75] Inventors: Prakash G. Kadkade, Marlborough; Charles R. Botticelli, Weston, both of Mass.

[73] Assignee: GTE Laboratories Incorporated, Waltham, Mass.

[21] Appl. No.: 148,885

[22] Filed: May 12, 1980

[51] Int. Cl.³ .............................................. A01G 1/00
[52] U.S. Cl. ....................................................... 47/58
[58] Field of Search ............................... 47/58, DIG. 6

[56] References Cited

U.S. PATENT DOCUMENTS

| | | | |
|---|---|---|---|
| 3,340,648 | 9/1967 | Frantzen | 47/58 |
| 4,060,933 | 12/1977 | Kadkade | 47/58 |
| 4,109,414 | 8/1978 | Kadkade | 47/58 |

OTHER PUBLICATIONS

Dwarfed Fruit Trees, Tukey, 1964, Macmillan Co., N.Y., p. 423.

Lighting for Plant Growth, Bickford+Dunn, 1972, Kent State Univ. Press, pp. 173-177.

Primary Examiner—Robert E. Bagwill
Attorney, Agent, or Firm—Fred Fisher

[57] ABSTRACT

Fruit set in crops can be increased with repeated exposures of the crops with light during the night times.

More particularly, light at 660 nm can be administered for periods of 1 to 240 minutes daily, during the night times, from bloom time for the crop (or prior thereto) to early fruit development for the crop, for time spans from 30 to 50 days.

Crops include apples (e.g., "Red Delicious"), almonds (e.g., "Nonpareil" and "Merced"), pistachios, soybean, calamondin, grapes, oranges, and cotton.

Light can be obtained from a light source selected from the group consisting of fluorescent light source and high intensity discharge-lithium filled metal halide light source having an intensity range 1 $\mu W/cm^2$ to 400 $\mu W/cm^2$.

2 Claims, No Drawings

USE OF NIGHT-BREAK LIGHTING TO INCREASE FRUIT SET IN ECONOMICALLY IMPORTANT FRUIT CROPS

BACKGROUND OF THE INVENTION

1. Field of the Invention

This invention relates to a method of increasing fruit set in crops, and, in particular, to the use of night-break lighting to increase fruit set in economically important fruit crops. Accordingly, it is a general object of this invention to provide new and improved methods of such character.

2. Description of the Prior Art

Some chemical growth regulators, including synthetic auxins, gibberellins, and cytokinins, have been considered to have fruit set improvement potential in various annual garden crops, but are without much success in tree crops. Disadvantageously, various chemical growth regulators for increasing fruit set have been ineffective, and have often produced undesirable side effects, including defoliation, root inhibition, fruit bud, and terminal shoot growth inhibition. Further, chemical regulators tend to leave potentially harmful residues in the soil.

3. Prior Art Statement

As a means of complying with the duty of disclosure set forth at 37 CFR 1.56, the following list is the closest prior art of which applicants are aware. This statement shall not be construed as a representation that a search has been made or that no better art exists.

| U.S. Pat. No. | Patentee | Issue Date |
| --- | --- | --- |
| 4,060,933 | Prakash G. Kadkade | December 6, 1977 |
| 4,109,414 | Prakash G. Kadkade | August 29, 1978 |

The patentee of the foregoing patents is a co-inventor of this invention. The instant invention is assigned to the same assignee as the foregoing patents. Kadkade, U.S. Pat. No. 4,060,933, discloses a method for stimulating organogenesis of explants in a tissue culture by illuminating the explant during at least a portion of its differentiation stage with light having a predominate spectral emission at a wavelength of approximately 660 nm.

Kadkade, U.S. Pat. No. 4,109,414, discloses a method for controlling abscission of plant parts by illuminating the plants during the night period with light having a wavelength selected from the group consisting of wavelengths in the order of 420 nm, 550 nm, 660 nm, and 740 nm.

SUMMARY OF THE INVENTION

Another object of this invention is to provide a new and improved use of specific lighting for increasing fruit set in economically important fruit crops without affecting fruit quality and tree growth.

Yet another object of this invention is to provide a new and improved method for maintaining the integrity of fruit quality features without endangering the environment with pollution and hazardous chemical residues.

Still another object of this invention is to provide for a new and improved use of a specific lighting system for increasing fruit set and subsequent fruit production without causing phytotoxicity.

In accordance with one embodiment of this invention, fruit set can be increased, without causing adverse effects on plant growth and development, through night-break exposure of a fruit crop with 660 nm light sources. (Light at different wavelengths, optionally, can be eliminated by filtering. Tests have indicated that filtering is not necessary. Desirably, light sources should peak at 660 nm.). Fruit set in crops can be increased through repeated exposures of the crops with light during night times. In accordance with certain features of the invention, 660 nm light is utilized for periods of 1 minute to 240 minutes daily, from bloom time to early fruit development for the crop. The time span can be from 30 to 50 days, and can be initiated prior to blossoming. The crops can include apples (e.g., "Red Delicious"), almonds (e.g., "Nonpareil", "Merced"), pistachios, grapes, oranges, soybean, calamondin, and cotton. The light can be obtained from a light source selected from a group consisting of a fluorescent light source and/or high intensity discharge-lithium filled metal halide light source having an intensity range 1 $\mu W/cm^2$ to 400 $\mu W/cm^2$.

DETAILED DESCRIPTION

In many economically important deciduous fruit crops (apples, almonds, pistachios, etc.), fruit production is often far below its potential as a result of inadequate fruit set.

The phenomenon of fruit set involves the stimulation of the ovary to develop into a rapidly growing fruit. The source of this stimulus and the time when it is received by the ovary are believed to be very important requirements for the initiation of fruit set. In general, the following events play important roles in regulation of fruit set:

I. Initiation of the Fruit Tissues

The origin of the fruit is found in the initiation of the floral primordia, which usually develops concomitantly with the flower.

II. Prepollination Development

A critical period in the growth and development of fruit is the prepollination and pollination phase of development. Promotion of ovary growth and extending the longevity of ovule during bloom period are important requirements for an increase in fruit set.

Pollination has several separate and independent functions. One is the initiation of the physiological process which culminates in fruit set. Another is to provide a male gamete for fertilization. The timing of pollination and synchronized pollen growth along with ovule development is an important factor for enhanced fruit set.

Though pollination may occur, fertilization is not absolutely assured. Sometimes pollen does not germinate, or when it does, the pollen tube may burst in the style or it may not elongate to reach the embryo sac. The germination of pollen is dependent upon the presence of a medium of the proper osmotic concentration and is stimulated by the presence of certain inorganic substances such as manganese sulfate, calcium, and boron. In addition to organic and inorganic substances present in and on the stigma, which stimulate germination, it appears that substances exist that chemically attract the growth of the pollen tube.

When the growth of the pollen tube is very slow, the style or possibly the entire flower may be abscised. When fruit set and growth are obtained by pollination, but fertilization does not occur, the fruit is said to be parthenocarpic. Although no seeds are present, seedlike structures can develop, as in the case of some seedless varieties of oranges and grapes.

The effect of pollination on fruit set and the influence of the resultant seed on fruit growth make pollination a crucial phase in the production of many fruit crops. For example, in almonds, and in certain apple varieties, where genetic incompatibility prevents self-pollination within the same clone, more than one pollen-fertile variety must be present to assure pollination. As pollen is transferred by insects, bees are often reared for this purpose.

III. Postpollination and Fertilization Development

After postpollination and fertilization, the plant enters into a phase of physiological activity that is second in intensity only to germination. The developing fruit no longer depends primarily upon the parent plant for a source of growth stimuli but, instead, receives its stimuli from developing seed within the fruit. In many fruits, direct correlation exists between either weight or length and seed number. This effect of the seed on fruit development is mediated through chemical substances. Furthermore, it is possible to correlate various physiological events in the development of a fruit with the presence of growth substances. It has been noted that the auxin levels reach a low at the time of flower drop, and, particularly, during the natural abscission of partially developed fruit that occurs where a heavy crop is obtained in fruit trees known as the "June drop". More recent studies indicate that there are present in the developing seeds many growth-promoting substances that stimulate fruit growth, such as several auxins, gibberellin-like compounds, and substances capable of stimulating cell division. The embryo and the endosperm appear to be the primary sources of these growth substances.

Although the control center of fruit growth is located in the seed, the raw materials for fruit development are supplied by the plant. Thus, the nutrition (promotion of transport of photosynthate to the developing fruits) and moisture availability of the plant directly affect fruit size.

Limiting factors for increased fruit set include synchronized growth and development of male and female reproductive structures, timely anthesis and pollination, pollen tube growth and timely fertilization, and development of embryo and stimulation of transport of nutrients and hormones from leaves to the developing fruitlets.

Increased fruit set can be associated with enhanced axillary flower bud development through the loss of apical dominance and reduced shoot growth, according to our preliminary studies with cotton.

FACTORS AFFECTING FRUIT SET

There are many factors affecting fruit set, including the influence of light around bloom time, weather conditions such as temperature and humidity, the development of the reproductive structures of plants, the availability of bees, and the temperatures during bee activity.

Fruit set has been found to improve by night-break treatment with a predominant 660 nm light source. "Night-break treatment" involves exposing the fruit crops during the night times with specific night lighting. The influence of light on fruit set was investigated using a variety of fruit. In particular, apple trees (var. "Red Delicious") were used as a model tree crop. Trees were exposed to night-break treatment with a 660 nm light source (fluroescent and/or high intensity discharge-lithium filled metal halide having an intensity range 1 $\mu W/cm^2$ to 200 $\mu W/cm^2$) for 1 minute to 15 minutes (12 a.m. to 12:15 a.m.) from the bloom time to early fruit development (about 45 days). The results showed a significant improvement in apple fruit set (97% more on the average relative to unlighted-control groups) which ultimately resulted in increased yield at harvest. Fruit growth (size) and quality (color, flesh firmness and solids) at the time of harvest were not affected adversely by night-break light treatment. Similarly, the terminal shoot growth and fruit bud development was normal. Advantageously, the administration of a specific night-break treatment with light, preferably peaking at 660 nm (low intensity range), for 30 to 45 days from a period prior to blossoming is sufficient to improve fruit set. Furthermore, fruit set can be increased using nightbreak exposure with 660 nm light sources without causing any adverse effects on plant growth and development.

The effect of night-break treatment with various crops is described below.

TABLE I

| | CALAMONDINS (Miniature Oranges) | | | |
|---|---|---|---|---|
| TREATMENT | SAMPLE SIZE (NUMBER OF TAGGED BUDS) | NUMBER OF FRUITS SET | PERCENT FRUIT SET | RELATIVE PERCENT INCREASE IN FRUIT SET |
| Control (no night-break treatment) | 100 | 54 | 54 | |
| Night-break lighted group | 100 | 73 | 73 | 35 |

The night-break light group in Table I was interrupted with the light peaking at 660 nm (100 $\mu W/cm^2$) for a period of 30 days (4hours per night: 10 p.m. to 2 a.m.).

TABLE II

| | SOYBEAN | | | |
|---|---|---|---|---|
| | VARIETY | | | |
| | Determinate (var. "Fiskby V") | | Indeterminate (var. "Portage") | |
| Parameters | Control | Night-break light group | Control | Night-break light group |
| Sample Size (Number of Plants) | 30 | 30 | 30 | 30 |
| Average Number of Pods per Plant at end of Light Treatment | 23.73 | 25.13 | 30.87 | 33.28 |

TABLE II-continued

| | SOYBEAN | | | |
|---|---|---|---|---|
| | VARIETY | | | |
| | Determinate (var. "Fiskby V") | | Indeterminate (var. "Portage") | |
| Parameters | Control | Night-break light group | Control | Night-break light group |
| Average Fresh Weight (g) of Pods per Plant | 28.36 | 29.68 | 23.79 | 28.47 |
| Average Fresh Weight (g) of Seeds per Plant | 12.07 | 12.05 | 13.80 | 15.94 |
| Average Dry Weight (g) of Seeds per Plant | 3.93 | 4.29 | 5.23 | 5.97 |

Night-break treatment with lights peaking at 660 nm (25 $\mu$W/cm$^2$) was provided for 28 days after the formation of flower buds at the apical portion of the plant. The data is an average of 6 replicates each of control and lighted conditions. Each replicate consisted of 5 plants.

Almonds

Almond tree crops have a history of setting poorly. A number of factors contribute to poor set, including pollination, ovule development, and weather conditions around bloom time. The longevity of ovule during the bloom period is considered to be very crucial for fertilization and subsequent fruit set. Under certain weather conditions (temperature below 60° F. and above 80° F., wet-rainy), the embryo sac may begin to degenerate before the pollen tube is able to grow down through the stylar region to liberate sperm for fertilization of egg.

To determine the desirable effects of light upon crops, tests were initiated in 1979 to determine whether fruit set in almond (var. "Nonpareil") could be influenced by night-break lights peaking at 660 nm. Night lighting was commenced on Feb. 25, 1979 and ended on Apr. 1, 1979. Monitoring of fruit growth and development was completed on Aug. 31, 1979.

Fruit set was increased under all of our night-break lighting conditions and was 61% to 90% more relative to controls. The increase in fruit numbers, which was observed at the completion of night-break light treatment, was sustained up to the harvest period Aug. 31, 1979). Moreover, fruit growth and nut quality at the time of harvest were not affected adversely. In addition, terminal shoot growth and fruit development for next year were normal. These results indicate that night-break lighting applied for 35 days Feb. 25, 1979 through Apr. 1, 1979) is effective in increasing fruit set and results in increased yield at harvest without affecting fruit growth and quality.

TABLE III

EFFECT OF NIGHT-BREAK TREATMENT WITH LIGHT PEAKING AT 660 NM ON FRUIT SET IN YOUNG ALMOND (VAR. "NONPAREIL") TREES

| TREATMENT | TOTAL NUMBER FLOWER BUDS | TOTAL FRUIT SET | PERCENT FRUIT SET | RELATIVE PERCENT INCREASE |
|---|---|---|---|---|
| CONTROL | 1221 | 137 | 11.22 | |
| LIGHTED 25 $\mu$W/cm$^2$ 60 minutes (12:15 a.m. to 1:15 a.m.) | 1735 | 299 | 17.23 | 54 |
| LIGHTED 100 $\mu$W/cm$^2$ 15 minutes (12:15 a.m. to 12:30 a.m.) | 1891 | 356 | 18.83 | 68 |

The experimental design of Table III consisted of 4 sections of young trees with 3 treatments assigned randomly within each section. Each treatment consisted of 4 "young" almond (var. "Nonpareil") trees. Night lighting was commenced on Feb. 25, 1979.

Each light-treated group was night-interrupted with different durations and intensities of light peaking at 660 nm. Controls did not receive night-break light exposure.

TABLE IV

EFFECT OF NIGHT-BREAK TREATMENT WITH LIGHT PEAKING AT 660 NM ON FRUIT SET IN OLD ALMOND (VAR. "NONPAREIL") TREES

| TREATMENT | TOTAL NUMBER FLOWER BUDS | TOTAL FRUIT SET | PERCENT FRUIT SET | RELATIVE PERCENT INCREASE |
|---|---|---|---|---|
| CONTROL | 25010 | 1399 | 5.59 | |
| LIGHTED* | 25389 | 2702 | 10.64 | 90.33 |

*Trees from the lighted group were exposed to 1500 W lithium metal halide lamps (1 $\mu$W/cm$^2$ to 400 $\mu$W/cm$^2$) for 15 minutes (12:15 a.m. to 12:30 a.m.). Controls did not receive night-break exposure. Fruit set counts were made on April 4-5, 1979.

The experimental design of Table IV consisted of 4 sections of older trees with 2 treatments assigned randomly within each section. Each treatment consisted of 20 "old" almond trees (var. "Nonpareil"). Night lighting was commenced on Feb. 25, 1979.

TABLE V

EFFECT OF NIGHT-BREAK LIGHTING PEAKING AT 660 NM ON ALMOND (VAR. "NONPAREIL") FRUIT SET

| SAMPLE SIZE | INTENSITY RANGE ($\mu$W/cm$^2$) | PERCENT FRUIT SET |
|---|---|---|
| 48 | 0.7-1.8 | 10.36 |
| 48 | 2-4 | 11.65 |
| 48 | 5-20 | 11.42 |
| 48 | 20-40 | 11.34 |
| 48 | 40-90 | 12.67 |
| 48 | 170-400 | 10.10 |

TABLE VI

EFFECT OF NIGHT-BREAK TREATMENT WITH LIGHT PEAKING AT 660 NM ON FRUIT SET IN ALMONDS (VAR. "MERCED")

| TREATMENT | TOTAL NUMBER FLOWER BUDS | TOTAL FRUIT SET | PERCENT FRUIT SET | RELATIVE PERCENT INCREASE |
|---|---|---|---|---|
| CONTROL | 2059 | 144 | 6.99 | |
| LIGHTED* | 2043 | 246 | 12.04 | 72.24 |

*Trees from the lighted group were exposed to 1500 W lithium metal halide lamps (5 to 50 $\mu$W/cm$^2$) for 15 minutes (12:15 a.m. to 12:30 a.m.). Controls did not receive night-break exposure. Fruit set counts were made on April 4-5, 1979.

The experimental design consisted of 4 sections of trees with 2 treatments assigned randomly within each section. Each treatment consisted of 4 "old" almond (var. "Merced") trees. Night lighting was commenced on Feb. 25, 1979.

Fruit Set—Almonds

In 1977, 275,390 acres in California were used to produce 312.2 million pounds (shelled) of almonds with a value of 275 million dollars. Fruit set is a major problem with almonds. The foregoing findings indicate that night-break lighting with light peaking at 660 nm is effective in increasing fruit set in almonds. The results indicate that a dramatic increase in improvement (61% to 90%) in set relative to control can be achieved by using night-break light treatment with light peaking at 660 nm for 34 days preceding the development of blossom clusters.

Apples

Apples are a major crop in the United States with more than 650,000 acres producing crops with a farm value in excess of 675 million dollars (1977). Land used for orchards in the United States is in excess of 4 million acres. The knowledge of abscission and fruit set can be applied in a variety of ways depending on the problems peculiar to the specific regions and crops.

Projection of Economic Value—Apples

It is estimated that "Delicious" production in most of the Eastern and Midwestern United States is now only 40% of its potential. "Delicious" remains the nation's number one apple in terms of sales. The Agricultural Research Service of the U.S. Department of Agriculture in Beltsville, Md., estimates that Eastern and Midwestern states are producing 17 million bushels less than they should, which at $5 per bushel, represents a loss of 85 million dollars to growers annually.

Our test results demonstrate a near doubling of fruit set by the time of harvest, through the use of light.

Apple Fruit Development and Abscission—Fruit Set (1978)

"Delicious" apple fruit production in the Northeastern United States has been far below its potential, primarily because of a lack of adequate fruit set. The purpose of our investigation with apples was to determine whether fruit set in apple (var. "Red Delicious") could be influenced by night-break light treatment (660 nm). Night lighting was commenced on May 22, 1978 and ended on July 4, 1978. Monitoring fruit and tree growth and development was completed on Oct. 30, 1978.

The experimental design in Belchertown, Mass., consisted of 4 sections with 3 experimental conditions assigned randomly within each section. Each light treatment involved 4 apple trees (var. "Red Delicious"). Each light-treated group was night interrupted with different durations of 660 nm fluorescent light (100 $\mu$W/cm$^2$). The first experimental group was exposed for 15 minutes (12 a.m. to 12:15 a.m.) and the second group was exposed for 1.5 minutes (starting at 12 a.m.). Controls did not receive night-break light exposure.

In addition, 2 trees were exposed to 400 W lithium metal halide lamps for 15 minutes (12 a.m. to 12:15 a.m.) as the light source with a maximum emission peak at 660 nm (intensity range: 30 $\mu$W/cm$^2$ to 200 $\mu$W/cm$^2$).

Fruit set was increased under all experimental light conditions, and was 97% more on the average relative to control. The increase in fruit number, which was observed at the completion of night-break light treatment, was sustained up to the harvest period (Oct. 5, 1978). Similarly, fruit growth (size) and quality (color, flesh firmness and soluble solids) at the time of harvest were not affected adversely by night-break lighting applied in May to July, 1978. In addition, the terminal shoot growth and next year's fruit development were normal. These results indicate that night-break lighting applied for 45 days (May 25, 1979 through July 5, 1978) is effective in improving fruit set and, consequently, increased yield at harvest without affecting fruit quality and tree growth.

TABLE VII

EFFECT OF NIGHT-BREAK LIGHTING ON APPLE SET (VAR. "DELICIOUS")

| TREATMENT | FRUIT SETS/ 100 BLOSSOM CLUSTERS (JULY 5, 1978) | INCREASE IN FRUIT SET OVER THE CONTROL (FOR 100 BLOSSOM CLUSTERS) | RELATIVE PERCENT INCREASE IN FRUIT SET |
|---|---|---|---|
| Control | 28.95 | | |
| Fluorescent 1.5 minutes (100 $\mu$W/cm$^2$) | 48.56 | 19.61 | 67.73 |
| Fluorescent 15 minutes (100 $\mu$W/cm$^2$) | 51.22 | 22.27 | 76.92 |
| *LiMH 15 minutes (30 $\mu$W/cm$^2$ to 200 $\mu$W/cm$^2$) | 71.02 | 42.07 | 145.31 |

*Only 2 trees were exposed to 400 W lithium metal halide lamps for 15 minutes (12 a.m. to 12:15 a.m.).

The experimental design consisted of 4 sections of trees with 3 treatments assigned randomly within each section. Each treatment consisted of 4 apple (var. "Delicious") trees. Night lighting was commenced on May 22, 1978, at the time of full bloom. Controls did not receive night-break exposure.

TABLE VIII

EFFECT OF NIGHT-BREAK TREATMENT WITH LIGHT WITH MAXIMUM EMISSION PEAK AT 660 NM ON FRUIT SET IN APPLE (VAR. "DELICIOUS")

| TREATMENT | FRUIT SET/100 BLOSSOM CLUSTERS | | | | | |
|---|---|---|---|---|---|---|
| Days after start of night-break treatment | 14 | 44 | 70 | 105 | 131 | Relative Percent |

TABLE VIII-continued

EFFECT OF NIGHT-BREAK TREATMENT WITH LIGHT WITH MAXIMUM EMISSION PEAK AT 660 NM ON FRUIT SET IN APPLE (VAR. "DELICIOUS")

| TREAT-MENT | FRUIT SET/100 BLOSSOM CLUSTERS | | | | | |
|---|---|---|---|---|---|---|
| Dates | 6/6/78 | 7/6/78 | 8/3/78 | 9/7/78 | 10/3/78 | 10/3/78 |
| Control | 68.88 | 28.95 | 27.86 | 26.75 | 26.2 | |
| *HID (LiMH) 15 minutes | 138.9 | 71.02 | 70.0 | 63.35 | 63.25 | 141.4 |
| Fluorescent 15 minutes | 73.67 | 51.22 | 50.77 | 48.96 | 48.89 | 86.6 |
| Fluorescent 1.5 minutes | 72.33 | 48.56 | 48.24 | 46.62 | 45.89 | 75.2 |

*Only 2 trees were exposed to 400 W lithium metal halide lamps (30 $\mu$W/cm$^2$ to 200 $\mu$W/cm$^2$) for 15 minutes (12 a.m. to 12:15 a.m.).

The experimental design consisted of 4 sections of trees with 3 treatments assigned randomly within each section. Each treatment consisted of 4 apple trees (var. "Delicious"). Night lighting was commenced on May 22, 1978, at the time of full bloom.

Repeat of Fruit Set in Apples, Studied in Belchertown, Mass. & Linden, Calif.

It has been demonstrated above, in 1978, that apple fruit set (var. "Red Delicious") could be increased significantly by night-break treatment with 660 nm lights under field conditions. The major objectives of 1979's study was to confirm our findings in different geographical regions of the United States. The experiments were initiated in April, 1979 and concluded in October, 1979.

Apple orchard night-break lighting experiments were carried out at the following locations: (1) Horticultural Research Center, Belchertown, Mass.; and (2) Wagner Orchards, Linden, Calif.

Night-break treatment increased fruit set from 11% to 72% over control, depending upon the light sources used and experimental conditions. These results conclusively confirm 1978's findings that night-break lighting is effective in enhancing fruit set in "Red Delicious" apples. This is especially important to Northeastern and Midwestern United States growers who lose over 17 million dollars annually as a result of poor fruit set.

TABLE IX

EFFECT OF NIGHT-BREAK TREATMENT WITH 660 NM LIGHT ON FRUIT SET IN APPLE (VAR. "RED DELICIOUS") 1979 STUDIES (BELCHERTOWN, MASSACHUSETTS)

| TREATMENT | SAMPLE SIZE (NUMBER OF TREES) | AVERAGE FRUIT SET/ 100 BLOSSOM CLUSTERS (7/6/79) | RELATIVE PERCENT INCREASE IN FRUIT SET |
|---|---|---|---|
| Control | 12 | 51.48 | |
| Fluorescent 8 minutes (100 $\mu$W/cm$^2$) | 8 | 67.12 | 30.47 |
| High-Intensity Discharge (LiMH: 8 min. 10–300 $\mu$W/cm$^2$) | 12 | 69.96 | 35.89 |
| | | *88.65 | 72.20 |

The experimental design consisted of 4 sections of 3 treatments assigned randomly within each section. Night-lighting was commenced on May 15, 1979, at the time late pink flower bud to full bloom stage. *Not including one bad tree.

*For fruit set studies, night-break light treatment was commenced on Apr. 4, 1979. Trees were exposed to the lights peaking at 660 nm (about 50 $\mu$W/cm$^2$) for 30 minutes (12:15 a.m. to 12:45 a.m.).

TABLE X

EFFECT OF NIGHT-BREAK LIGHT TREATMENT ON FRUIT SET (VAR. "RED DELICIOUS") 1979 STUDIES (LINDEN, CALIFORNIA)

| TREATMENT | TOTAL NUMBER OF BLOSSOMS (4/4/79) | FRUIT SET PER 100 BLOSSOMS (6/3/79) | RELATIVE PERCENT INCREASE IN FRUIT SET* |
|---|---|---|---|
| CONTROL | 118 | 209 | |
| LIGHTED | 83 | 233 | 11.48 |

Apple Studies: 1979 vs. 1978

The relatively poor showing of the 1979 apple crop, when compared to the 1978 apple crop, is attributed to bad weather in the field. Excessive rain caused flooding in numerous crop areas, placing roots heavily under water. During bloom time, heavy pouring of rain adversely affected bee activity.

In general, however, it has been demonstrated that fruit set in apples (var. "Red Delicious") can be substantially increased by night-break treatment with the lights peaking at 660 nm under field conditions.

General

During the past years, our studies have demonstrated that fruit set in apples (var. "Red Delicious") and almonds (var. "Nonpareil" and "Merced") can be increased by night-break treatment with 660 nm light under field conditions. Similarly, our studies indicate that fruit set in calamondins can also be increased by night-break exposure with lights peaking at 660 nm. An increase in fruit set due to night-break light treatment could be associated with a number of factors: (1) Enhanced pollination and pollen tube growth, (2) Promotion of ovary growth and extending the longevity of ovule during bloom period, and stimulation of fertilization process, and (3) Promotion of transport of photosynthate and reduced ethylene synthesis in fruits.

It will be obvious to those skilled in the art that various modifications can be performed in this invention without departing from the spirit and scope of the appended claims.

What is claimed is:

1. A method for increasing fruit set in a crop comprising,
   over a time span of at least 30 days, repeatedly exposing said crop with 660 nm light for periods of 1 to 240 minutes daily, during the night times from bloom time for said crop to early fruit development for said crop, wherein
   said 660 nm light is obtained from a high intensity discharge-lithium filled metal halide light source having an intensity range of 1 $\mu$W/cm$^2$ to 400 $\mu$W/cm$^2$.

2. The method as recited in claim 1 wherein each said daily period is limited to 1 to 15 minutes.

* * * * *